United States Patent [19]

Violette

[11] 4,059,134

[45] Nov. 22, 1977

[54] MOBILE DRUM FILLING ASSEMBLY

[76] Inventor: Theodore T. Violette, 2603 Wall St., Long Beach, Calif. 90804

[21] Appl. No.: 697,988

[22] Filed: June 21, 1976

[51] Int. Cl.² .......................... B65B 31/00; B67D 5/00
[52] U.S. Cl. ........................................ 141/59; 141/83; 141/93; 141/232; 141/242; 214/41 R; 214/44 R
[58] Field of Search .................... 141/1, 59, 83, 84, 93, 141/94, 129, 231, 232, 233, 234, 237, 240, 281, 283, 285, 392, 242; 214/41 R, 44 R

[56] References Cited

U.S. PATENT DOCUMENTS 2,827,185   3/1958   Feigin ............................. 214/44 R X Primary Examiner—Richard E. Aegerter
Assistant Examiner—Frederick R. Schmidt
Attorney, Agent, or Firm—William C. Babcock

[57] ABSTRACT

A mobile drum filling assembly that may be drawn along side a railroad tank car or other liquid containing tank to draw liquid therefrom, and sequentially fill a number of drums with predetermined weights of the liquid. The assembly is preferably of such design that two drums may be filled and weighed concurrently, with the weighed drums thereafter moving by gravity on conveyors to a platform where they are sequentially removed preferably by lift truck to an adjacent holding area, into adjacent warehouse facilities, or onto a truck bed or other vehicle for transportation to a desired destination. Fumes that may arise during the filling operation together with air drawn upwardly by vacuum means to a wash tower, with the fumes being removed before the air with which they were mixed, is discharged to the ambient atmosphere. The liquid may be withdrawn from the tank car either by gravity flow, an electrically driven pump, or by pressurizing the interior of the tank car with air. Should it be desired, the assembly may be employed to circulate the liquid out of and into the tank car for a desired period of time prior to the drum filling operation to assure that the liquid in the tank car is homogenious in nature and thoroughly mixed.

6 Claims, 9 Drawing Figures

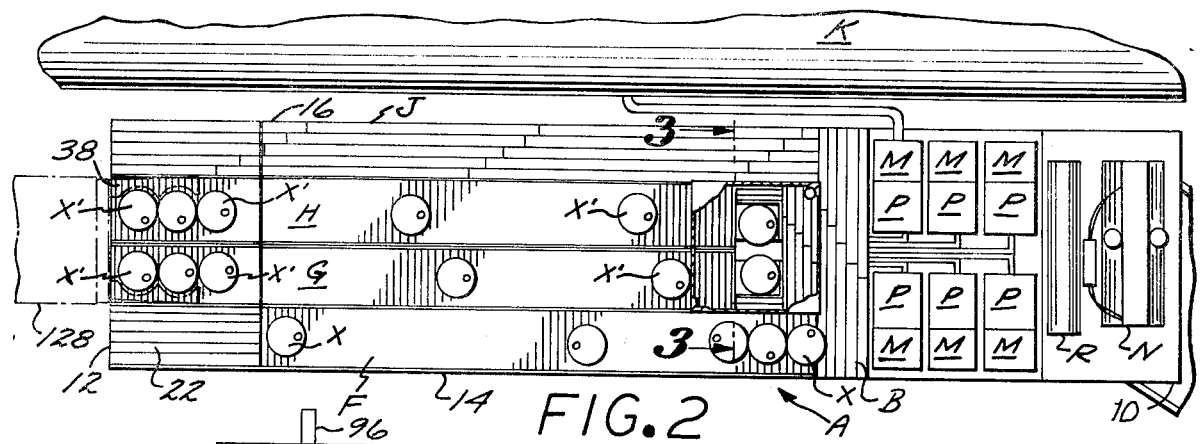
FIG. 2
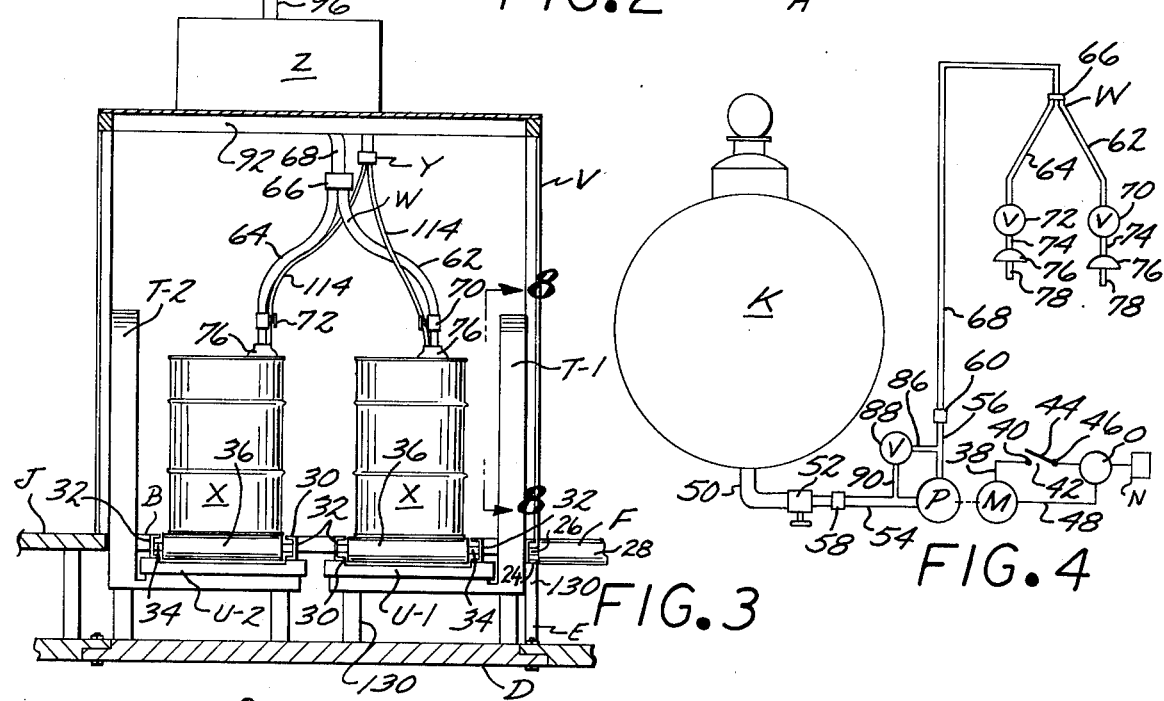
FIG. 3
FIG. 4
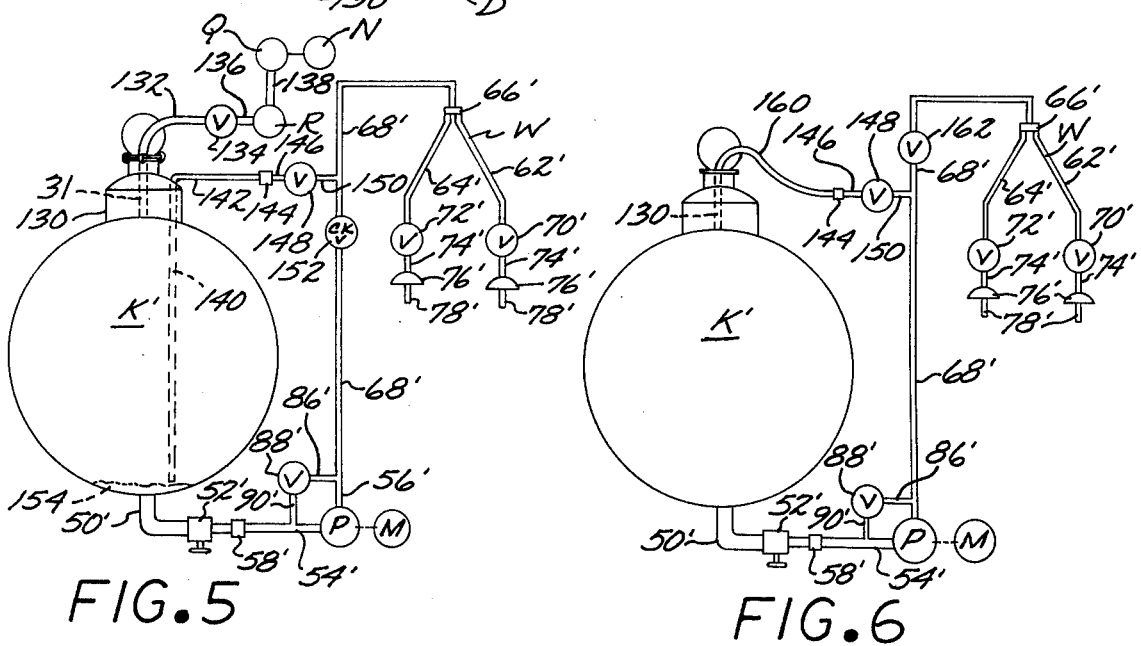
FIG. 5
FIG. 6

MOBILE DRUM FILLING ASSEMBLY

BACKGROUND OF THE INVENTION

1. Field of the Invention

Mobile Drum Filling Assembly.

2. Description of the Prior Art

In the past, it has been common practice to fill drums with desired weights of liquid at fixed expensive installations that may occupy valuable land space adjacent docks and railroad sidings. Such installations require crews to be maintained at full time thereon, even though the drum filling facilities may be used only intermittently or for a portion of a day.

A major object of the present invention is to provide a mobile drum filling assembly that will eliminate numerous operational disadvantages of prior fixed drum filling facilities, and the invention capable of being utilized at any desired location irrespective of whether electric power is available thereon.

Another object of the invention is to provide a drum filling assembly that is fabricated from standard commercially available materials, is simple and easy to use, and permits the rapid and efficient filling of drums with liquid with minimum contamination of the ambient atmosphere.

Still further object of the invention is to furnish a mobile drum filling assembly that is far less expensive to fabricate and maintain than fixed land based facilities of this nature that were previously used, and one that requires a minimum of personnel in the operation thereof.

SUMMARY OF THE INVENTION

The mobile drum filling and weighing invention includes an elongate wheel supported vehicle having first and second ends, and first and second longitudinally extending sides. An internal combustion engine is preferably mounted on the vehicle adjacent the first end thereof, and the engine serving to drive an electric generator and an air compressor. A number of electric motor driven pumps are supported on the vehicle rearwardly of the engine. Each of the motor driven pumps is operated by electricity supplied from the electric generator.

The vehicle rearwardly of the pump is provided with a first floor on which the drum filling operator stands. First and second laterally spaced scales are situated adjacent the floor and extend upwardly therefrom, with the scales including first and second platforms that rotatably support a number of parallel rollers.

A first elongate conveyor extends longitudinally on the vehicle from the second end to the first floor, with the first conveyor adjacently disposed to the first side of the vehicle. The first conveyor rotatably supports the number of transverse first rollers. The first conveyor slopes downwardly towards the first end of the vehicle. The first conveyor can interchange and be operative with either side of elongated wheel supported vehicle.

Second and third conveyors of the same general structure of the first conveyor are supported in longitudinally extending positions on the vehicle and aligned with the first and second platforms. The second and third conveyors slope downwardly from the first floor to a second floor on the vehicle adjacent the second end thereof.

A horizontal cat walk extends longitudinally on the vehicle adjacent the second side thereof. The horizontal cat walk is interchangeable with the first elongated conveyor when tank access permits only one direction and/or side approach. The vehicle is adapted to be moved to a position adjacent a tank car situated on a railroad siding, with the cat walk adjacently disposed to the tank car. The tank car containing the liquid to be dispensed in weighed amounts into empty drums may be of the type through which liquid discharges by gravity and pump through a lowered valve outlet, or through which the liquid discharges from an upper valve outlet when the tank car is pressured with air.

A roof structure extends upwardly from the floor of the vehicle and serves to support a dual hose assembly that has first and second valve nozzles that may be removably extended into the bung holes in two empty drums resting on the first and second platforms.

The hose assembly is removably connected to the discharge on one of the pumps, and a hose extending from the section of that pump to a suitable discharge outlet on the tank car. First and second valve nozzles form a part of the hose assembly, with the nozzles having flexible seals thereon that engage the head of the drums, when the drums are on the first and second platforms.

A small wash tower is situated on the roof of the structure, and in which wash tower spray of water is maintained. The interior of the seals on the first and second nozzles are by flexible hose connected to the interior of the wash tower. Fumes arising from the liquid being dispensed into the drums on the first and second platforms flows to the interior of the wash tower and is recovered prior to air from the wash tower being discharged to the ambient atmosphere, and as a result the atmosphere is not contaminated during the filling operation.

In use, a flat bed truck is backed up to the vehicle. Empty drums on the truck are sequentially placed on the first conveyor and moved forwardly thereon by gravity to the vehicle supported first floor where they are sequentially placed on the first and second platforms by the filling operator. The filling operator, by use of the first and second valve nozzles, may concurrently fill the platform supported drums until desired weights of liquid are therein. Plugs are then screwed into the bung holes in the drums after the filling operation is completed. The filled drums are now pushed from the first and second platform by the filling operator onto the second and third conveyors where they coast by gravity to the second floor. The filled and weighed drums are removed from the second floor preferably by lift truck equipped with applicant's patented drum carrying tool U.S. Pat. No. 2,732,247 to adjacent holding area, storage, or transportation rail box-car or truck bed. The filling and weighing operation above described is sequentially performed on the drums as they move forwardly to the first floor on the vehicle, and the filled drums then moving rearwardly to the second floor where they are removed at the speed that will permit optimum and continuous drum filling.

BRIEF DESCRIPTION OF THE DRAWINGS

FIG. 2 is a top plan view of the drum filling and weighing invention illustrated in FIG. 1;

FIG. 3 is a combined transverse cross-sectional and elevational view of the inventon taken on the line 3—3 of FIG. 2;

FIG. 4 is a diagrammatic view of the pump and hose assembly used in removing liquid from the tank car;

FIG. 5 is a diagrammatic view of the tank car and the hose assembly used in removing liquid therefrom, when the liquid is discharged from the tank car by pressurizing the interior thereof;

FIG. 6 is a diagrammatic view of the equipment used when it is desired to circulate liquid into and out of the tank car prior to the drum filling operation, with the recirculation of the liquid assuring that it is homogeniously mixed prior to being discharged into the drum;

DESCRIPTION OF THE PREFERRED EMBODIMENT

Figure 1:
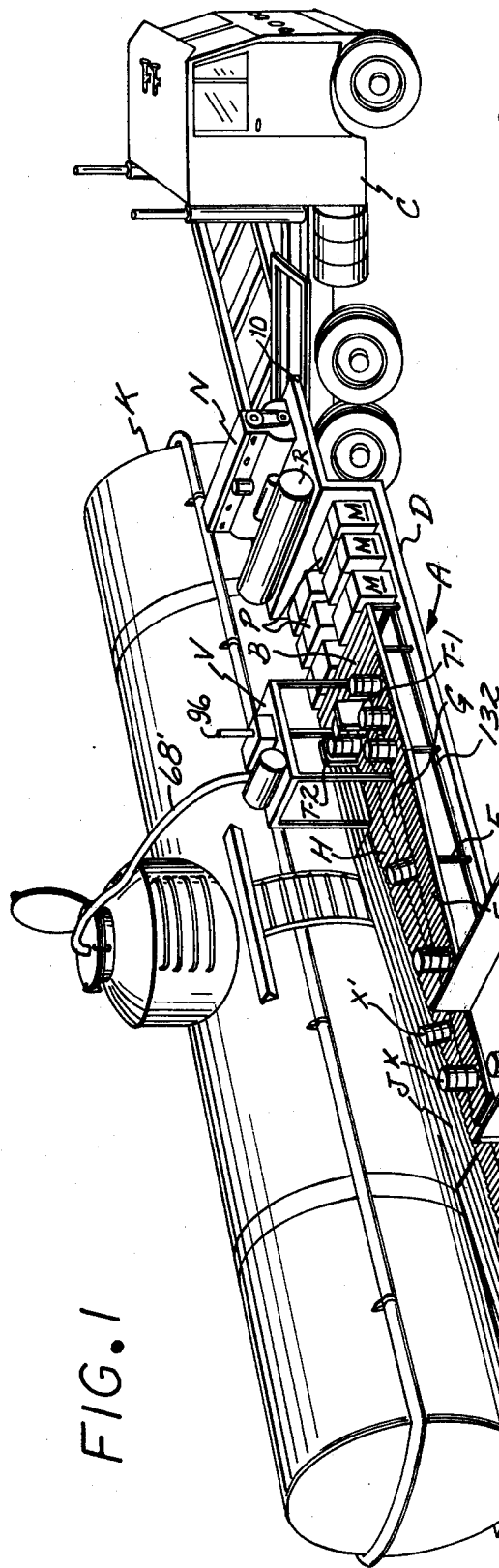
FIG. 1 is a perspective view of a tank car situated on a railroad siding, and the drum filling and weighing invention adjacently disposed to the tank car, and empty drums being supplied to the invention from a truck.

The drum filling and weighing invention A as may best be seen in FIG. 1 is illustrated as including a trailer B that has a flat, rectangular bed D. The trailer may be moved from one location to another by a tractor C. A framework E extends upwardly from bed D. The framework E supports first, second and third longitudinally extending conveyors F, G and H, respectively. The bed D has a first forward end 10 and a second rearward end 12, and first and second longitudinal sides 14 and 16.

A horizontal cat walk J is removably supported by framework E and is adjacently disposed to the second side of bed D. Horizontal cat walk J is interchangeable with either side 14 and 16. The invention A may be moved by tractor C to have the cat walk J adjacently disposed to a tank car K situated on a railroad siding L. The first end 10 of bed D supports an engine N that drives an electric generator O and air compressor Q. Compressed air from compressor Q flows to a reservoir R. The framework E rearwardly from first end 10 supports a horizontal floor B as may be seen in FIG. 1. First and second laterally spaced scales T-1 and T-2 extend upwardly above floor B. Scales T-1 and T-2 include first and second platforms U-1 and U-2.

A roof supporting frame V extends upwardly from floor B. Frame V supports a dual valved hose assembly W for concurrently filling two drums X, when the latter are resting on first and second scale platforms U-1 and U-2. A suction assembly Y is provided that withdraws fumes and displaced air from the drums X as the latter are filled with liquid and directs the air and withdrawn fumes to a wash unit Z. The unit Z prevents the fumes from being discharged to the ambient atmosphere to contaminate the latter. The empty drums X are illustrated in the drawings as being delivered to a position adjacent the tank car K by a power operated vehicle 18 that has a flat bed 20 on which the drums rest. A platform 22 is supported by the framework E adjacent the rearward end of the first conveyor F. The first platform 22 is horizontal. The first platform 22 is horizontal and is adjacently disposed to the second rearward end 12 of bed D as may be seen in FIG. 1 that an operator standing on the platform may remove empty drums X from bed 20 to start them moving forwardly on first conveyor F, as well as to tighten drum bungs, and apply lifting tongs to the filled drums X that have moved to the rearward ends of the second and third conveyors G and H. The rearward end of the bed 20 of vehicle 18 when empty drums X are being unloaded therefrom is adjacently disposed to first side 14 and 5 to 6 feet forwardly from the rearward second end 12 as best seen in FIG. 1. The first conveyor F slopes downwardly and forwardly on the framework E to terminate on the forward end thereof in the floor B. The first conveyor F is defined by two parallel laterally spaced channels 24 one of which is shown in FIG. 3, which channels support a number of spaced parallel shafts 26 therebetween that are transversely positioned relative to the channels. The shafts 26 rotatably support a number of steel rollers 28. The rollers 28 may be fabricated from other materials that will withstand the passage of the empty drums X thereover. When the empty drums X are moved from the flat bed 20 onto the first conveyor F, the drums X tend by gravity to move forwardly on the rollers 28 to the floor B. The first and second platforms U-1 and U-2 each have short horizontal conveyors 30 supported thereon, with each conveyor being defined by two parallel laterally spaced channels 32 that have spaced shafts extending therebetween that rotatably support rollers 36 as can best be seen in FIG. 3. The drums X as they move onto the floor B from the first conveyor F are subsequently moved by the filling operator (not shown) to positions on the conveyor 30 that are supported on the first and second platforms U-1 and U-2. After the drums X have been filled and weighed on the first and second platforms U-1 and U-2 of first and second scales T-1 and T-2, the fill drums are manually moved from the conveyors 30 by the filling operator (not shown) onto the second and third conveyors G and H.

The second and third conveyors G and H are of the same structure as the first conveyors F, but with the second and third conveyors sloping rearwardly from the first and second platforms U-1 and U-2 to terminate adjacent a rearwardly disposed transverse stop 37, which stop is shown in FIG. 1. The filled and weighed drums X are designated in FIG. 2 with the notation X'.

Figure 7:
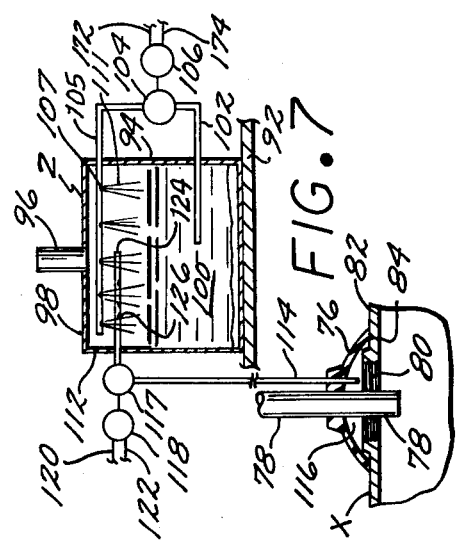
FIG. 7 is a cross-sectional view of the wash tower used in removing fumes from air displaced from the drum as the filling operation progresses.
Figure 9:
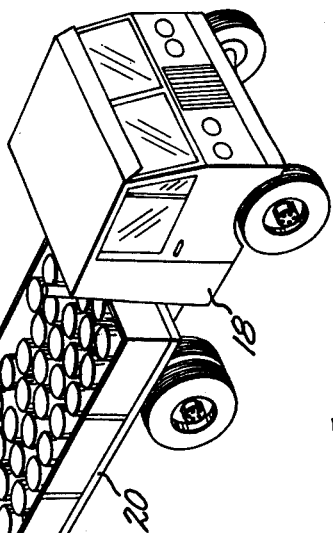
FIG. 9 is a fragmentary side elevational view of the rear portion of the wheel supported bed with the conveyors removed therefrom and a ramp secured thereto to permit a lift truck to be transported on the bed.

Each of the motors M is driven by electricity furnished by the electric generator O as shown diagrammatically in FIG. 4. Each motor M has a first conductor 38 extending therefrom to a contact 40 of a switch 42 which switch includes a blade 44 that engages the contact 40 when the switch 42 is in the closed position. Blade 44 is connected by a conductor 46 to one terminal of the electric generator O. Second terminal of the electric generator O is connected by a conductor 48 to a second terminal of the motor M. The tank car K shown in FIG. 4 is of the type that has a liquid discharge outlet 50 in the bottom thereof through which fluid may flow when a valve 52 is placed in an open position. Pump P shown in FIG. 4 has a tubular inlet 54 through which liquid may flow. The pump has a tubular discharge 56. The tubular inlet 54 is by suitable fittings 58 of conventional design removably connectable to the valve 52, and the valve 52 when placed in an open position allowing the pump P to withdraw liquid from the tank car K and discharge the liquid through the tubular discharge member 56. The tubular pump discharge 56 is removably connectable by a fitting 60 of conventional design, preferably of the quick disconnect type, to the dual valve hose assembly W. The dual valve hose assembly W incudes first and second hose 62 and 64 that have first ends thereof extending into a fitting 66 which fitting 66 is connected by a third hose 68 to the fitting 60. The first and second hoses 62 and 64 on their lower ends are provided with normally closed, manually operable first and second valves 70 and 72. Each of the valves 70 and 72 has a tubular member 74 depending therefrom and each tubular member 74 having a convex-concave resilient sealing member 76 supported thereon. The sealing member 76 is shown in detail in FIG. 7. Each sealing member 76 has a tubular filling nozzle 78 extending downwardly therebelow, which filling member may be removably inserted in an internally threaded bung hole opening 80 formed in the head 82 of the drum X that is being filled. Each sealing member 76 includes a peripheral end area 84 that is in sealing contact with the head 82 as best seen in FIG. 7. To permit the pump P to operate continuously, as liquid is intermittently dispensed by opening the valves 70 and 72, the discharge 56 of the pump P is shown in FIG. 4 has a tubular member 86 connected thereto which member extends to a pressure relief valve 88. The pressure relief valve 88 has a tubular member 90 extending therefrom that is in communication with the tubular liquid inlets 54. In FIG. 2 it will be seen that a number of the pump P and motor M assemblies are mounted on the invention A, and any one of these may be used as the pump P and motor M as illustrated in FIG. 4. Thus, a pump P with its associated motor M may be used to unload liquid from a tank car K by use of one of the dual valve hose assemblies W, and after the conclusion of this unloading operation the invention A may be utilized to unload liquid from a second car that has completely different physical and chemical characteristics of the liquid previously dispensed. In the unloading of the liquid from the second car a new pump P and associated motor M is selected, and a clean dual valve hose assembly W is used in place of the hose assembly W previously used in a tank car unloading operation. In this manner, there is no possibility of a pump P used in the first tank car unloading operation cross-contaminating the contents of a second tank car K as the latter is being unloaded and dispensed in weighed amounts into the drums X.

The roof 92 of the structure V, as may be seen in FIG. 7, supports the wash assembly Z. The wash assembly Z as may be seen in FIG. 7 includes an enclosed container 94 that has a tubular stack 96 extending upwardly from the top 98 thereof. A quantity of water 100 is situated in the interior of the container 94 as shown in FIG. 7. This water is drawn into an intake tube 102 that is connected to the suction side of a pump 104 which pump is driven by an electric motor 106 that is supplied with electric power through two conductors 108 and 110 that extend to the electric generator O. The discharge from the pump 104 is connected to a pipe 105 that extends into the upper interior portion of the container 98, and the portion of the pipe 106 within the container having apertures 107 formed therein through which water discharges as sprays as shown in FIG. 7. The stack 96 is at all times in communication with the interior 112 of the container 94 and the ambient atmosphere.

Each of the sealing members 76 has a conduit 114 extending therethrough, and the conduit being in communication with the confined space 116 defined by the sealing member 76 when it is in sealing engagement with a head 82 of a drum X. The conduit 114 is connected to the intake of a blower 117 that is driven by an electric motor 118. The electric motor 118 is supplied with electric current from a generator O through two conductors 120 and 122. The discharge of the blower 117 is connected to a tube 124 that extends into the interior 112 of container 94, and a portion of the tube 124 within the container having apertures 126 therein.

When two of the drums X are resting on the first and second platforms U-1 and U-2 as shown in FIG. 3, and the discharge tubes 78 are extending through the bung holes 80, as illustrated in FIG. 7, the sealing members 76 will be in sealing engagement with the heads 82 of the drums. The first and second valves 70 and 72 may now be opened to concurrently discharge liquid from the hose assembly W into the drums X. As liquid discharges into the drums X from the hose assembly W, air will be displaced from the drums together with fumes from the liquid, and this mixture of air and fumes will be drawn upwardly by the blower 117 that is driven by the motor 118, to be discharged through the apertures 126 into the interior 112 of the wash assembly Z. The sprays of water 111 will be brought into intimate contact with the mixture of air and fumes, and remove the fumes therefrom, prior to the air in the interior 112 flowing to the ambient atmosphere through the stack 96. After the first and second scales T-1 and T-2 indicated to the filling operator (not shown) that the desired quantity of liquid has been dispensed into the two drums resting on the first and second platforms U-1 and U-2, the first and second valves 70 and 72 are closed, with the hose assembly W then being removed from the drums. External stoppers (not shown) are now screwed into the bung holes 80, one of which bung holes is shown in FIG. 7. The filling operator now manually shoves the two filled drums X' onto the second and third conveyors G and H, with the drums then moving downwardly on the second and third conveyors by gravity to come to rest on the second platform 38 as shown in FIG. 2. The framework E includes a number of spaced uprights 130 that may be arranged in a desired configuration, with the uprights serving to support first, second and third conveyors F, G and H a substantial distance above the bed B.

When the tank car K is of the type that can be pressurized, and liquid dispensed through the dome 130 thereof, the piping arrangement shown in FIG. 5 may be employed. The tank car K has a tubular filling member 131 to which a hose 132 may be removably connected to a valve 134 that is connected by a conduit 136 to the reservoir R. The reservoir R is supplied with air under pressure through a conduit 138 that extends to compressor Q, which compressor is driven by the engine N. The tank car K includes a pressurized liquid discharge outlet tube 140 as a part thereof, which tube may be connected to a hose 142 that extends to a quick disconnect fitting 144 that, in turn, is connected by a conduit 146 to a manually operated valve 148 that, in turn, is connected by a conduit 150 to the tube 68'. Tube 68' has a valve 152 therein as may be seen in FIG. 5. Elements in the piping arrangement shown in FIG. 5 that are common to the arrangement illustrated in FIG. 4, are identified by the same numerals previously used, but with primes being added thereto.

When the tank car K' shown in FIG. 5 is to have liquid therein dispensed into drums X by use of the invention A, the hose 132 is connected to the filling tube 131, and valve 134 placed in the open position. Air from the reservoir R flows into the interior of the tank car K', and forces liquid therein upwardly through the tube 140 and conduit 142, fitting 144, valve 148, tube 150, and conduit 150' to the hoses 62' and 64' from which the liquid may be concurrently dispensed into two of the drums X when the latter are resting on the first and second platforms U-1 and U-2. Liquid 154 remaining in the bottom of the tank car K' after the pressurized liquid dispensing operation has been completed, may be removed by use of the pump P as previously described. When the pump P is being used for this purpose, the valve 148 will be in the closed position. The check valve 152 in conduit 68' as shown in FIG. 5 allows liquid to discharge to the dual valve hose assembly W when the pump is used, but prevents liquid being discharged from the tank car K' by air pressure flowing to the pump P. In FIG. 6 it will be seen that the piping arrangement shown in FIG. 5 can be modified to recirculate liquid 154 into and out of the tank car K' prior to the liquid being dispensed in weighed quantities into the drum X. When such recirculation is required, a hose 160 is connected to the fitting 144, and the hose removably connected to the liquid filling tube 131 that forms an integral part of the tank car K'. Conduit 68' has a manually operable valve 162 therein as may be seen in FIG. 6. When it is desired to recirculate the liquid, the valve 162 is placed in the closed position and the valve 148 in the open position. The motor M is then caused to drive the pump P, with liquid being withdrawn from the tank car K' through the tubular member 50', valve 52' when in the open position, fitting 58', conduit 54', to flow through the pump P and discharge 56' into the conduit 68'. When valve 162 is in the closed position, and valve 148 in the open position, the liquid discharged from the pump P flows though the conduit 68', conduit 150, valve 148, conduit 146, fitting 144, and hose 160 to the liquid filling tube 130. If the liquid in the tank car K'tends to stratify, the recirculating of the liquid in the above-described manner renders it homogenious, prior to the liquid being dispensed from the tank car either by use of the piping arrangement shown in FIG. 4 or the optional piping arrangement shown in FIG. 5. The cat walk J permits personnel operating the invention A to walk longitudinally relative to the invention and adjacent the tank car K.

Figure 8:
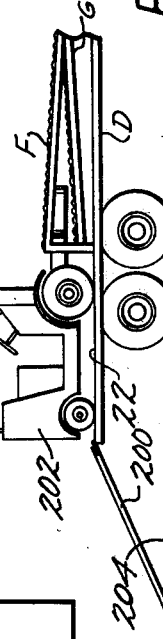
FIG. 8 is a front elevational view of one of the scales forming a part of the invention.

The use and operation of the invention is extremely simple. The empty drums X are delivered to the invention A on a vehicle 18, as may be seen in FIG. 1. The drums X are sequentially moved from the vehicle 18 onto the first conveyor F where they move by gravity to the floor S. The filling operator (not shown) moves the empty drums onto the first and second platforms U-1 and U-2. By use of the dual filling assembly W, the empty drums X on the platform may be concurrently filled to have a desired weight of liquid therein which weight is indicated on the graduated face 170 of the first and second scales T-1 and T-2, with one of the scales T-1 being shown in FIG. 8. After a desired weight of liquid has been dispensed into the two drums X, the filling tubes 78 are removed from the bung holes 80, and externally threaded stoppers (not shown) threaded into the bung holes. The filled drums X' are now moved from the platforms onto the second and third conveyors G and H, where they move by gravity to the second platform 38 which may be seen in FIG. 2. During the filling operation, the area surrounding the bung holes 80 on the drums X being filled are engaged by the seal 76. Air displaced from the interior of the drums X as well as fumes from the liquid are drawn upwardly through the conduit 114 by operation of the blower 116 to be discharged through the apertures 124 within the container 98. Sprays of water 110 contact the mixture of air and fumes to remove the fumes from the latter. Air free of the fumes discharges through the stack 96 to the ambient atmosphere. The water 100 in the container 98 is recirculated therethrough by operation of the pump 104 that is driven by the motor 106. Electric power for the motor 106 is supplied thereto by two conductors 172 and 174.

The rearward portions of the first, second and third conveyors F, G and H and the part of the frame E supporting the same are removably from the bed B to permit an inclined ramp 200 to be secured to the second end 22 of the bed when the stop 37 is removed therefrom. The ramp 200 permits a lift truck 202 to move from the ground surface 204 onto the bed B to be transported with the invention A from one location to another. The lift truck is employed with applicant's carrying tool in removing filled and weighed drums X' from the rearward ends of the second and third conveyors G and H.

Although drums X have been identified as the containers being filled, the term drums is to be considered as including five gallon cans and the like.

The use and operations of the invention has been described previously in detail and need not be repeated.

What is claimed is:

1. A portable device that may be moved adjacent a bulk liquid holding tank having a liquid inlet and liquid outlet to sequentially dispense predetermined weighted quantities of said liquid into a plurality of drums, each of said drums being of the type that includes a bottom and an upwardly disposed head that has a bung hole therein that may be removably closed by a stopper, said device including:

a. an elongate rectangular portable bed having a first forwardly disposed end and a second rearwardly disposed end, and first and second longitudinal sides;
   b. a frame work extending upwardly from said bed;
   c. first, second and third elongate conveyors having first forward ends and second rearward ends, said conveyors supported from said frame work in elevated positions above said bed and extending longitudinally relative to the latter, said first conveyor adjacently disposed to said first side of said bed, said second ends of said conveyors adjacently disposed to said second end of said bed, said first conveyor angularly disposed to the extent that drums placed on said second end thereof move by gravity to said first end thereof, and said second and third conveyors angularly disposed to the extent that drums placed on said first ends thereof move by gravity to said second ends thereof;
   d. a first conduit removably connectable to said liquid outlet of said tank;
   e. power-operated means for establishing a sufficient differential in pressure between liquid in the interior of said tank and the interior of said first conduit that liquid in said tank will flow into said first conduit;
   f. an engine on said bed for driving said power-operated means;
   g. first and second laterally spaced scales that have first and second laterally spaced weighing platforms that are supported from said bed adjacent said first end thereof, said first and second weighing platforms longitudinally aligned with said second and third conveyors and disposed adjacent said first ends thereof;

h. a horizontal floor supported from said frame work adjacent said first and second scales on which an operator may stand to sequentially remove drums from said first end of said first conveyor and place them on said first and second weighing platforms to be filled with said predetermined weighed quantities of said liquid, with said drums on said first and second weighing platforms after having said predetermined weighed quantities of said liquid dispensed therein having said stoppers disposed in said bung holes, and said operator moving filled drums from said weighing platforms onto said second and third conveyors to permit said filled drums to coast by gravity to said second ends of said second and third conveyors;

i. a horizontal platform supported by said frame work adjacent said second end of said first conveyor on which a person may stand to move empty drums onto said first conveyor and to tighten the stoppers in bung holes of filled drums that move towards said second end of said bed on said second and third conveyors;

j. an elevated valved dual hose assembly above said first and second weighing platforms that receives liquid from said first conduit, said dual hose assembly including first and second tubular valved portions that extend into said bung holes of first and second drums on said first and second weighing platforms to permit said first and second drums to have said liquid concurrently dispensed thereinto from said first conduit; and k. second means operatively associated with said dual hose assembly for preventing fumes from said liquid being dispensed into said drums on said first and second weighing platforms escaping to the ambient atmosphere.

2. A device as defined in claim 1 in which each of said first, second and third conveyors includes:

1. two parallel, laterally spaced rigid members;

m. a plurality of transverse, longitudinally spaced shafts that extend therebetween; and n. a plurality of rollers rotatably supported on said shafts, said rollers movably supporting one of said drums when a bottom of the latter rests thereon.

3. A device as defined in claim 1 in which said bulk liquid holding tank is a railroad tank car and said device in addition including:

1. a plurality of wheels that movably support said bed to permit said bed to be moved to a longitudinally extending position, with said second side of said bed adjacent said tank car; and m. an elongate cat walk supported on said frame work adjacent said second side of said bed along which an operator may walk, said cat walk having first and second end, said first end adjacent said floor.

4. A device as defined in claim 1 in which said bulk liquid holding tank is a railroad tank car that has said liquid outlet extending downwardly from the bottom thereof and said power operated means including:

1. a pump having a suction opening and a discharge opening, said suction opening connected to said first conduit and said discharge opening to said valved dual hose assembly, said pump supported by said frame work;

m. an electric motor for driving said pump;

n. an electric generator driven by said engine; and o. an electric circuit connecting said generator to said motor, said electric circuit including a switch which when closed completes said circuit to cause said electric generator to energize said motor to drive said pump.

5. A device as defined in claim 1 in which said second means includes:

1. first and second resilient seals on said first and second tubular portions, said seals in sealing contact with first and second of said heads of said drums when the latter are resting on said first and second weighing platforms;

m. a water holding container that has an exhaust stack that extends from the interior of said container to the ambient atmosphere;

n. means for recirculating said water in said container and forming it into a spray in the interior of said container;

o. a power-driven blower having an intake and an exhaust, said exhaust in communication with the interior of said container above the level of said water therein;

p. first and second circuits in communication with said intake of said blower and extending through said first and second seals to communicate with said bung holes most adjacent thereto, said blower with drawing air displaced from said first and second drums on said first and second weighing platforms during the filling thereof together with fumes from said liquid and discharging the mixture of air and fumes to the interior of said container, said spray removing said fumes from said mixture, and air free of said fumes exhausting to the ambient atmosphere through said stack.

6. A device as defined in claim 1 in which said bulk liquid holding tank is a railroad tank car having a dome in which a liquid filling tube and a pressurized liquid outlet is disposed and said power operated means includes:

1. an air compressor driven by said engine;

m. a compressed air reservoir that receives compressed air from said compressor; and n. a second conduit that extends from said compressed air reservoir to said liquid filling tube to pressurize the interior of said tank car and force said liquid in said tank car to said first conduit to be dispensed in said predetermined weighed quantities into said drums.

* * * * *